(12) United States Patent  
Taki et al.

(10) Patent No.: US 7,952,820 B2
(45) Date of Patent: May 31, 2011

(54) OPTICAL PART HOLDING MEMBER AND PRODUCTION METHOD THEREOF

(75) Inventors: Ikuo Taki, Odawara (JP); Hideki Hyuga, Nagoya (JP); Hideki Kita, Nagoya (JP); Yasunori Tanaka, Saitama (JP)

(73) Assignees: FUJIFILM Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 12/782,219

(22) Filed: May 18, 2010

(65) Prior Publication Data

US 2010/0315728 A1    Dec. 16, 2010

(30) Foreign Application Priority Data

Jun. 11, 2009   (JP) ................. 2009-140331

(51) Int. Cl.
*G02B 7/02* (2006.01)
(52) U.S. Cl. ...................................... 359/811
(58) Field of Classification Search .............. 359/811, 359/813, 817, 818, 819, 820, 822, 823, 824
See application file for complete search history.

(56) References Cited

U.S. PATENT DOCUMENTS

| | | |
|---|---|---|
| 6,265,334 B1 | 7/2001 | Sechi et al. |
| 7,112,549 B2 | 9/2006 | Yoshitomi et al. |
| 2001/0039126 A1 | 11/2001 | Ebinuma et al. |
| 2002/0128535 A1* | 9/2002 | Kikuchi et al. ............ 600/101 |
| 2007/0191209 A1 | 8/2007 | Hyuga et al. |
| 2008/0218721 A1 | 9/2008 | Schoeppach et al. |

FOREIGN PATENT DOCUMENTS

| | | |
|---|---|---|
| JP | 11-343168 A | 12/1999 |
| JP | 2002-220277 A | 8/2002 |
| JP | 2004-184882 A | 7/2004 |
| JP | 2006-019894 A | 1/2006 |
| JP | 2006-350187 A | 12/2006 |
| JP | 2007-238430 A | 9/2007 |

OTHER PUBLICATIONS

EP Communication, dated Sep. 23, 2010, issued in corresponding EP Application No. 10165063.8, 6 pages.

* cited by examiner

*Primary Examiner* — Timothy J Thompson
(74) *Attorney, Agent, or Firm* — Sughrue Mion, PLLC

(57) ABSTRACT

The present invention relates to an optical part holding member made of ceramic and a production method thereof, and provides an effective permeability to prevent dew condensation. The optical part holding member is made of a silicon nitride ceramic base composite material to hold an optical part, which is produced through a process of nitriding in which silicon is caused to react with nitrogen. By using the silicon nitride ceramic base composite material containing silicon carbide and an iron compound, an airflow volume of 50 ml or more per minute is achieved in an effective airflow area of 1.5 cm$^2$ when an air pressure is added with a pressure difference of 0.4 MPa between both surfaces of a sample of the silicon nitride ceramic base composite material having 1 mm thickness, and the optical part holding member having effective permeability to prevent dew condensation is obtained.

8 Claims, 3 Drawing Sheets

OPTICAL PART HOLDING MEMBER AND PRODUCTION METHOD THEREOF

BACKGROUND OF THE INVENTION

1. Field of the Invention

The present invention relates to an optical part holding member made of ceramic and a production method of the optical part holding member.

2. Description of the Related Art

A cellular phone with a camera has become widespread and a camera is increasingly installed in an automobile for backward confirmation. For a photographing lens unit constituting a camera that is installed in a camera-equipped cellular phone and a camera-equipped automobile, a fairly high degree of reliability is required. In particular, since automobiles are entirely used outdoors and cellular phones are often used outdoors, it is necessary to provide performance stability and durability under severe environmental conditions such as a high temperature, a low temperature and a temperature shock caused by an abrupt change in temperature.

Accordingly, a lens holding member made of ceramic that is least affected by change in temperature has received attention.

Here, as a holding member to hold an optical part such as lens, there is reported a case in which ceramic of Sposhmen or Cordierite that possess low thermal expansion, rigidity and abrasion resistance and exhibits black color is used (Japanese Patent Application Publication No. 2002-220277). Also, for example, a proposition is made about ceramic for holding an optical part, which exhibits black color due to carbon content with a Cordierite base (Japanese Patent Application Publication No. H11-343168).

In addition, although not an application to an optical part holding member, there is a report on suppression of uneven coloring or the like at the time of sintering through blackening closely packed ceramic.

However, in the case of closely packed ceramic, the accuracy of a sintered body varies due to large shrinkage at the time of sintering, which results in the necessity to carry out a secondary processing, and poses a problem of a cost increase and the like when, for example, this is used as an optical part holding member requiring a high uniformity and a high accuracy.

Still more, there is proposed a technique capable of providing a holding member made of ceramic at a low cost in practical use by combining a precision molding technique that uses a porous ceramic part that exhibits black color without processing after the porous ceramic part is sintered (Japanese Patent Application Publication No. 2007-238430).

In addition, prevention of dew condensation is another important issue for an outdoor use.

Japanese Patent Application Publications No. 2006-19894 and No. 2006-350187 disclose that it is effective to use a permeable material for a part constituting a lens unit in a camera device to prevent dew condensation. However, complicated steps and special materials such as making a hole and disposing a permeable material in the hole are required.

Ceramic that changes little in its dimensions for a temperature change is effective for achieving performance stability for an environmental change. However, it is difficult to perform an additional process and a part incorporation for permeability of airflow similar to the prior arts, since the ceramic has high strength while being fragile.

Therefore, forming the whole entirely with a permeable material is an effective means since it eliminates after-processing. However, it is not possible to form a part as a whole entirely with a conventional material.

Further, any of the patent literatures does not describe a pore produced in a process of degreasing and sintering ceramic and the permeability by the pore, and also does not discuss an effectiveness for dew condensation.

SUMMARY OF THE INVENTION

In view of the above circumstances, it is an object of the present invention to provide an optical part holding member made of ceramic having an effective permeability to prevent dew condensation and a production method of the optical part holding member.

According to an aspect of the invention, an optical part holding member is made of a silicon nitride ceramic base composite material to hold an optical part, wherein silicon carbide and an iron compound are contained in the silicon nitride ceramic base composite material, and an airflow volume per minute is 50 ml or more in an effective airflow area of 1.5 cm$^2$ when an air pressure is added with a pressure difference of 0.4 MPa between both surfaces of a sample having a 1 mm thickness of the silicon nitride ceramic base composite material.

Here, it is confirmed that dew condensation is sufficiently prevented in the case of an optical part holding member made of the above-described silicon nitride ceramic base composite material in which an airflow volume per minute is 50 ml or more in an effective airflow area of 1.5 cm$^2$ when an air pressure is added with a pressure difference of 0.4 MPa between both surfaces of a sample in the thickness of 1 mm.

According to another aspect of the invention, a method of producing an optical part holding member is a method of producing an optical part holding member to hold an optical part, made of a silicon nitride ceramic base composite material that is produced through a process of nitriding in which a reaction is caused between silicon and nitrogen as main contents of a molding body to become nitrided. To obtain the above-described optical part holding member, a process of nitriding in which silicon carbide powder and iron oxide powder are mixed to silicon powder and molding is performed, thereafter silicon as main content is nitrided in nitrogen, thereby producing a silicon nitride ceramic base composite material in which an airflow volume is controlled according to each composition.

Here, in the method of producing an optical part holding member, when the molded body is produced, it is preferable that a mixed-powder is produced such that, with respect to silicon powder, silicon carbide powder and less than 10 mass % of iron oxide $Fe_3O_4$ powder is mixed and the thus obtained mixed power is used for molding. Preferably, when the molded body is produced, a mixed-powder is produced such that, with respect to silicon powder, 30 mass % of silicon carbide powder and 5 mass % or less of iron oxide $Fe_3O_4$ powder is mixed and the thus obtained mixed power is used for molding.

More preferably, in the method of producing an optical part holding member according to another aspect of the invention, by using the above-described raw powder and by using a molded body that is produced by injection molding after an organic binder is added to the raw powder in an appropriate amount, thereafter through processes of removing the organic binder and nitriding in which silicon as main content is nitrided in nitrogen, it is possible to obtain an optical part holding member to hold an optical part, which is made of a silicon nitride ceramic base composite material having a complex-shape and in which airflow volume is controlled.

According to the present invention, an optical part holding member made of ceramic having an effective permeability to prevent dew condensation is produced.

DETAILED DESCRIPTION OF THE INVENTION

An exemplary embodiment of the present invention will be described in the following.

Figure 1:
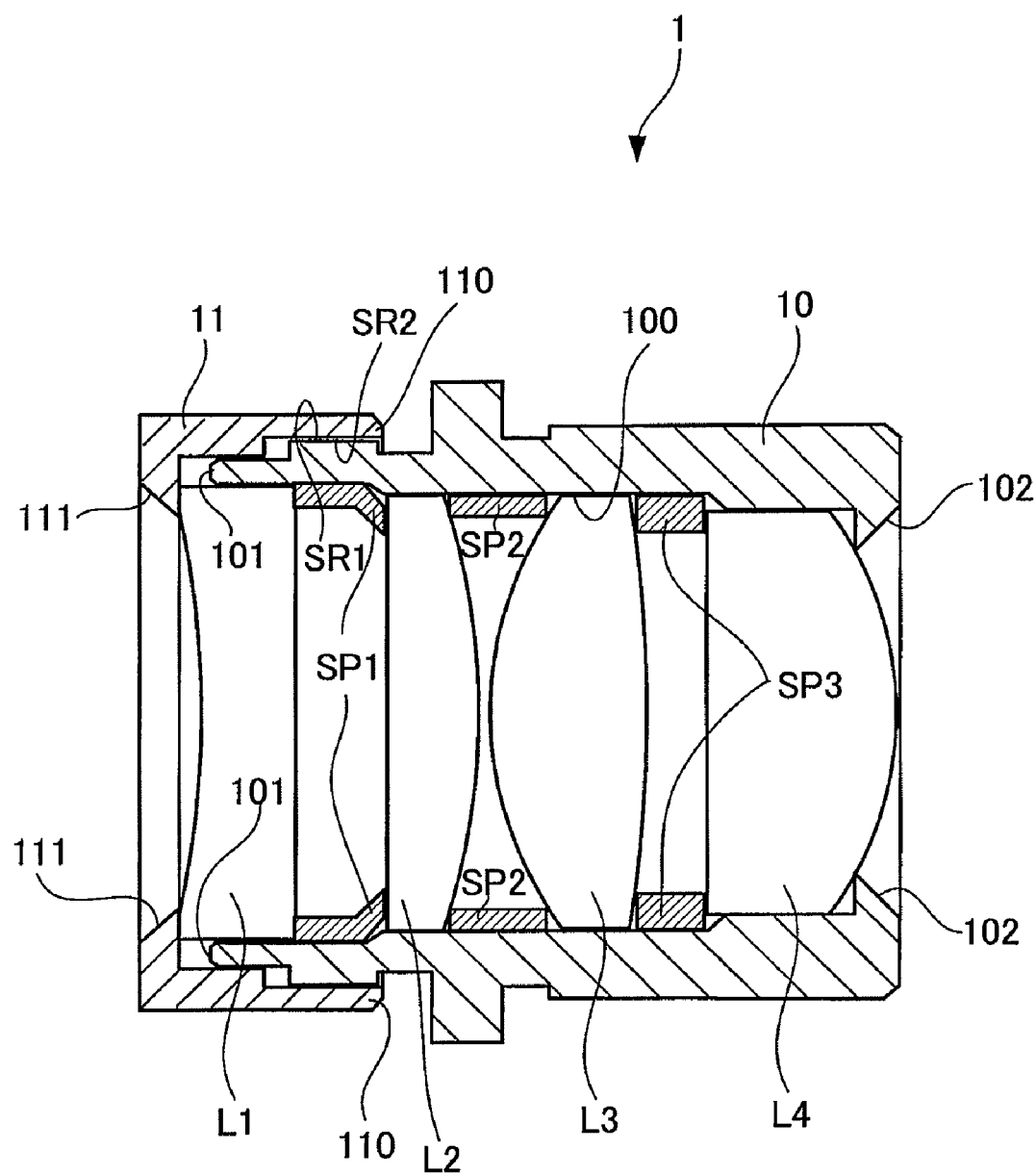
FIG. 1 is a diagram illustrating a configuration of a lens unit provided with a lens holder made of ceramic.

FIG. 1 is a diagram illustrating a configuration of a lens unit provided with a lens holder made of ceramic.

A lens unit 1 illustrated in FIG. 1 is provided with a lens holder 10, and the lens holder 10 has a hollow part 100 having an object-side opening 101 and an image-forming-side opening 102. Formed on an object-side periphery of the lens holder 10 is a male thread SR1. From the object-side opening 101, lenses L1 through L4 and spacing rings SP1 through SP3 are inserted while being aligned along the optical axis. In this example, the lenses L1 through L4 and the spacing rings SP1 through SP3 are alternately disposed and sequentially inserted into the hollow part 100 of the lens holder 10. Alternatively, there is a lens unit having such a configuration that the spacing rings SP1 through SP3 are omitted and positioning of each lens is performed by causing edges of the lenses to contact with each other.

Furthermore, the lens unit 1 illustrated in FIG. 1 is provided with a holder cap 11 to hold the lenses L1 through L4 and the spacing rings SP1 through SP3 inserted into the hollow part 100 of the lens holder 10, to fix them from the object-side opening 101. The holder cap 11 has: a mounting opening 110 into which an object-side part of the lens holder 10 is inserted; and optical openings 111 for exposing a central section of the lens L1 that is inserted most closely to the object side among the plural lenses inserted into the lens holder. Formed on an inner wall inside the mounting opening 110 is a female thread SR2 to be engaged with the male thread SR1. By engaging the male thread SR1 in the female thread SR2, an edge of an object-side surface of the lens L1 disposed at the position closest to the object side is pressed.

The lens unit 1 of FIG. 1 is assembled such that the holder cap 11 presses the lenses L1 through L4 and the spacing rings SP1 through SP3 in the lens holder 10 toward the image-forming-side opening.

Here, in consideration of installing the lens unit 1 in an automobile, ceramic is used for the lens holder 10 and glass lens is used for the lenses L1 through L4. Furthermore, also for the holder cap 11, ceramic of a same quality as that of the lens holder 10 is used. In addition, in this example, also the spacing rings SP1 through SP3 made of ceramic are used.

In this example of FIG. 1, the lens holder 10 (or a combination of the lens holder 10 and the holder cap 11) corresponds to one example of the optical part holding member of the present invention.

For the lens holder 10 and the holder cap 11, a silicon nitride ceramic base composite material containing silicon carbide and iron compound is used. The linear expansion coefficient of this sintered nitride silicon base ceramic is approximately $3 \times 10^{-6}$ and almost equal to the linear expansion coefficient of glass (5 to $10 \times 10^{-6}$) that is the material of the lenses L1 through L4. Furthermore, the spacing rings SP1 through SP3 are made of ceramic having zirconia as a raw material and the linear expansion coefficient thereof is approximately 8 to $11 \times 10^{-6}$, which is almost equal to the linear expansion coefficient of glass (5 to $10 \times 10^{-6}$) as well.

As described, in the case of the lens unit 1 illustrated in FIG. 1, for any of the lens holder 10, the holder cap 11, the lenses L1 through L4, and the spacing rings SP1 through SP3, which are included in the lens unit 1, materials whose linear expansion coefficients are markedly small and also approximately equal to each other are used, thereby realizing a structure that is usable in a wide range of temperature environment.

Incidentally, the sintered nitride silicon base ceramic that is used for the lens holder 10 and the holder cap 11 is a porous ceramic, and has a permeable airflow volume of 50 ml or more per minute in the effective airflow area of 1.5 cm$^2$ when an air pressure is added with a pressure difference of 0.4 MPa between both surfaces of a sample in thickness of 1 mm. Owing to the permeability of this porousness, dew condensation is also effectively prevented.

EXAMPLES

Hereafter, examples of the present invention will be explained through explanation of a series of experiments for searching for a suitable material for the above-described lens holder 10 (or the lens holder 10 and the lens cap 11).

Figure 2:
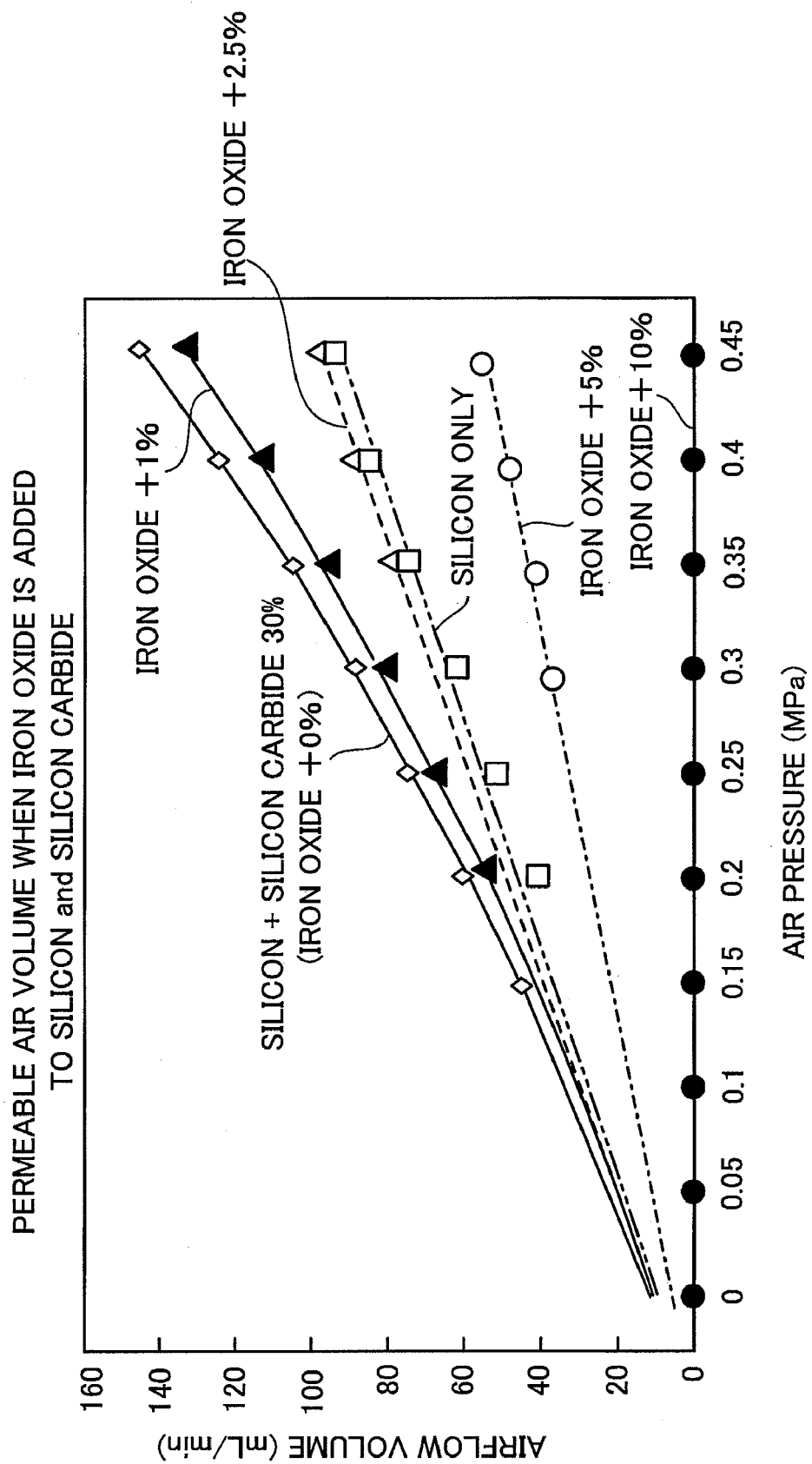
FIG. 2 is a diagram illustrating permeable airflow volume when iron oxide is further added to a mixed-material of silicon and silicon carbide.

FIG. 2 is a diagram illustrating permeable airflow volumes of a silicon nitride ceramic base composite material that is obtained through processes of molding mixed powder in which iron oxide Fe$_3$O$_4$ powder is further added to silicon powder and silicon carbide powder, molding mixed powder, and then nitriding silicon in nitrogen. The diagram indicates change in the permeable airflow volumes with respect to ratios of Fe$_3$O$_4$ that is added.

Incidentally, the various types measuring results of the ceramic base compound material used for the measurement here are results that are obtained by using a measurement apparatus that has an effective airflow area of 1.5 cm$^2$ for a disc having 1 mm in thickness and 14 mmφ in diameter, which is obtained by adding an organic binder to the above-described raw powders, carrying out injection molding to produce a board-shaped molded body, and then decreasing and nitriding the molded body. The measurement apparatus measures a sample by fixing it with an O ring, and has an effective airflow range of 13.8 mmφ, which corresponds to an effective airflow area of 1.5 cm$^2$ when the effective airflow range is converted to the effective airflow area.

In the following, % of material ratios denotes all mass %.

The horizontal axis of FIG. 2 denotes an air pressure (MPa) added between both surfaces of the sintered board member in thickness of 1 mm, and the vertical axis denotes an airflow volume per minute (mL).

FIG. 2 illustrates permeable airflow volumes of sintered bodies made of various types of materials in which an adding ratio of iron oxide Fe$_3$O$_4$ powder to a mixed-material made of 70% of silicon and 30% of silicon carbide is changed.

For example, "iron oxide+5%" represents that a mixed-material made of 70% of silicon and 30% of silicon carbide makes up 95% while iron oxide Fe$_3$O$_4$ makes up 5%. Additionally, "silicon and silicon carbide 30%" in FIG. 2 represents that iron oxide is 0% (not mixed), and "silicon only" represents that silicon is 100% without containing both silicon carbide and iron oxide.

Figure 3:
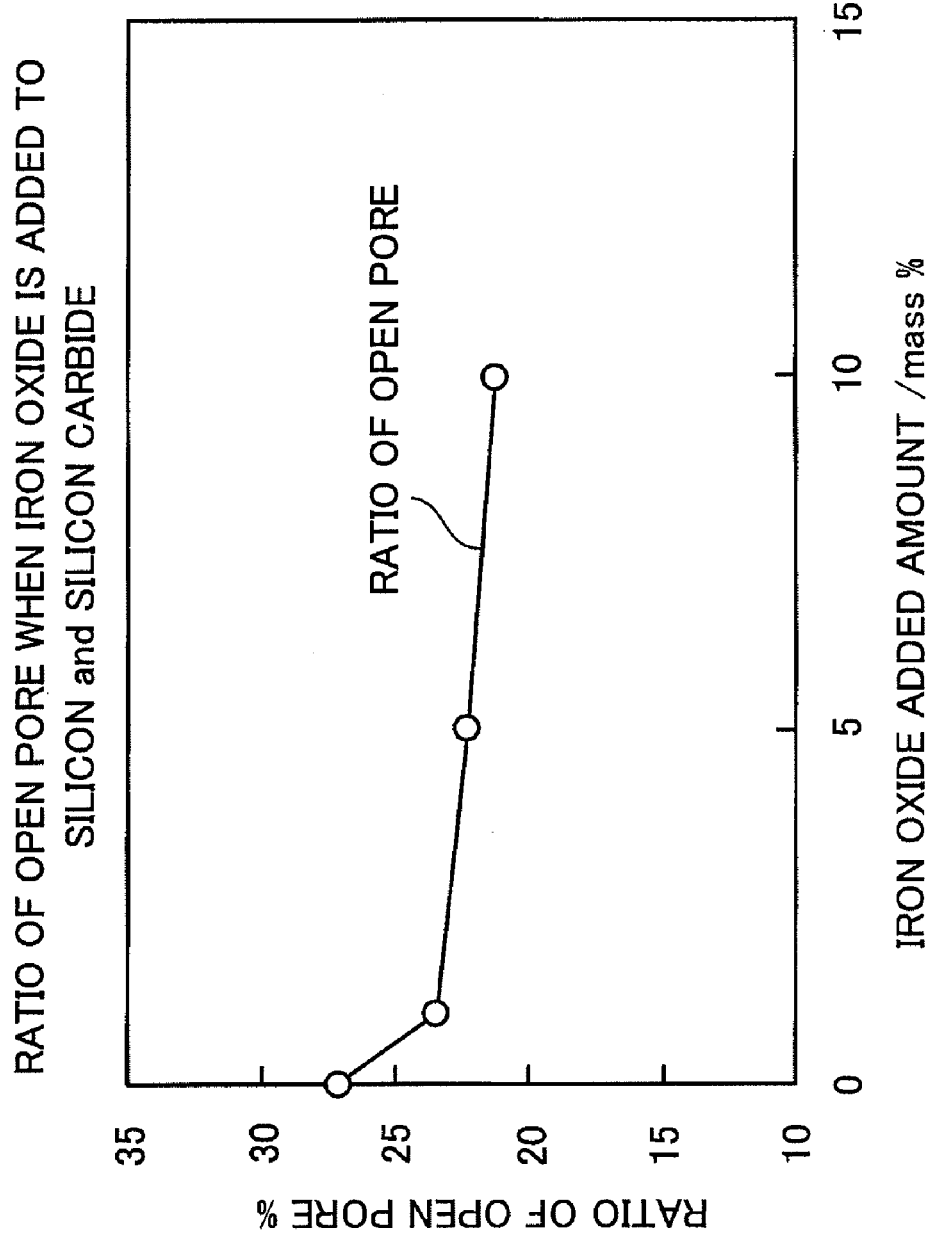
FIG. 3 is a diagram illustrating a ratio of open pore when iron oxide is further added to the mixed-material of silicon and silicon carbide.

Moreover, FIG. 3 is a diagram illustrating a ratio of open pore when iron oxide is further added to the mixed-material of silicon and silicon carbide.

Similar to FIG. 2, FIG. 3 illustrates a ratio of open pore of a sintered body of various materials in which a ratio of iron oxide $Fe_3O_4$ that is added to a mixed-material of 70% of silicon and 30% of silicon carbide is changed.

The horizontal axis of FIG. 3 denotes an added amount of iron oxide $Fe_3O_4$ (mass %), and the vertical axis denotes a ratio of open pore (%).

As an added amount of $Fe_3O_4$ is increased, a ratio of open pore sharply decreases with the increase of added amount when the added amount is small and thereafter decreases mildly, as illustrated in FIG. 3. However, the permeable airflow volume decreases sharply as the added amount increases, as illustrated in FIG. 2, and when "added amount of iron oxide $Fe_3O_4$ is 10%", the permeable airflow volume is approximately zero.

Here, sufficient performance to prevent dew condensation is obtained when the lens unit 1 illustrated in FIG. 1 is assembled from the lens holder 11 and the holder cap 12 illustrated in FIG. 1, which are made of the silicon nitride ceramic base composite material that is obtained by using raw powder of "5% of iron oxide $Fe_3O_4$", adding an organic binder thereto, then subjecting it to injection-molding, degreasing and nitriding.

FIGS. 2 and 3 illustrate an example of changing an added amount of iron oxide $Fe_3O_4$ powder to 70% of silicon powder and 30% of silicon carbide powder. Alternatively, it is possible to adjust the permeable airflow volume by changing a mixing ratio at which silicon powder and silicon carbide powder are mixed while maintaining an added amount of iron oxide $Fe_3O_4$ powder at a constant. However, when the amount of iron oxide $Fe_3O_4$ powder contained in the mixed powder is 10% in the mixed powder as illustrated in FIG. 2, the airflow of the thus obtained silicon nitride ceramic base composite material is hindered, so it is preferable that the amount of iron oxide $Fe_3O_4$ powder contained in the mixed powder is less than 10%.

More preferably, the amount of iron oxide $Fe_3O_4$ powder that is added to 70% of silicon powder and 30% of silicon carbide powder is 5% or less in the mixed-material.

What is claimed is:

1. An optical part holding member made of a silicon nitride ceramic base composite material to hold an optical part, wherein silicon carbide and an iron compound are contained in the silicon nitride ceramic base composite material, and an airflow volume per minute is 50 ml or more in an effective airflow area of 1.5 cm$^2$ when an air pressure is added with a pressure difference of 0.4 MPa between both surfaces of a sample having a 1 mm thickness of the silicon nitride ceramic base composite material.

2. The optical part holding member according to claim 1, wherein the iron compound contained in the silicon nitride ceramic base composite material is iron silicide.

3. A method of producing an optical part holding member, wherein the optical part holding member includes a silicon nitride ceramic base composite material that is produced through a process of, with respect to silicon powder, mixing silicon carbide powder and iron oxide powder to obtain a mixed powder, producing a molded body by using the obtained mixed powder, and nitriding through a reaction with nitrogen, and silicon carbide and an iron compound are contained in the silicon nitride ceramic base composite material, and an airflow volume per minute is 50 ml or more in an effective airflow area of 1.5 cm$^2$ when an air pressure is added with a pressure difference of 0.4 MPa between both surfaces of a sample having a 1 mm thickness of the silicon nitride ceramic base composite material.

4. The method of producing the optical part holding member according to claim 3, wherein when the mixed powder is produced, iron oxide $Fe_3O_4$ powder is added such that the $Fe_3O_4$ powder is less than 10 mass % of a total amount of the silicon powder and the silicon carbide powder, and the thus obtained mixed power is used.

5. The method of producing the optical part holding member according to claim 3, wherein when the mixed powder is produced, iron oxide $Fe_3O_4$ powder is added to the silicon powder such that the $Fe_3O_4$ powder is equal to or less than 5 mass % of a total amount of raw material powder in which 30 mass % of the silicon carbide powder is added to the silicon powder, and the thus obtained mixed power is used.

6. The method of producing the optical part holding member according to claim 3, wherein the molded body is produced by injection molding with the use of the mixed powder.

7. The method of producing the optical part holding member according to claim 4, wherein the molded body is produced by injection molding with the use of the mixed powder.

8. The method of producing the optical part holding member according to claim 5, wherein the molded body is produced by injection molding with the use of the mixed powder.

* * * * *